(12) United States Patent
Beekmann

(10) Patent No.: US 10,479,210 B2
(45) Date of Patent: Nov. 19, 2019

(54) ELECTRIC VEHICLE CHARGING STATION AND METHOD FOR CONTROLLING AN ELECTRIC VEHICLE CHARGING STATION

(71) Applicant: Wobben Properties GmbH, Aurich (DE)

(72) Inventor: Alfred Beekmann, Wiesmoor (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 15/747,412

(22) PCT Filed: Aug. 4, 2016

(86) PCT No.: PCT/EP2016/068635
§ 371 (c)(1),
(2) Date: Jan. 24, 2018

(87) PCT Pub. No.: WO2017/021488
PCT Pub. Date: Feb. 9, 2017

(65) Prior Publication Data
US 2018/0215279 A1    Aug. 2, 2018

(30) Foreign Application Priority Data

Aug. 4, 2015 (DE) .................. 10 2015 112 752

(51) Int. Cl.
*B60L 53/63* (2019.01)
*B60L 11/18* (2006.01)
(52) U.S. Cl.
CPC ................ *B60L 11/1844* (2013.01)

(58) Field of Classification Search
USPC ......................................... 320/109
See application file for complete search history.

(56) References Cited

U.S. PATENT DOCUMENTS 9,045,048 B2    6/2015   Yukizane et al.
2011/0245987 A1  10/2011  Pratt et al.
(Continued)

FOREIGN PATENT DOCUMENTS

DE    102009046422 A1    5/2011
DE    102010062362 A1    6/2012
(Continued)

*Primary Examiner* — Robert Grant
(74) *Attorney, Agent, or Firm* — Seed Intellectual Property Law Group LLP

(57) ABSTRACT

An electric vehicle charging station is provided. The electric vehicle charging station includes an interface, by way of which the charging station receives energy from an electrical energy supply grid, an energy intermediate storage device for intermediate storage of energy received or transmitted by way of the interface from the electrical energy supply grid, a plurality of output connections for charging electric vehicles and a control unit for controlling the energy intermediate storage in the energy intermediate storage device and for controlling the delivery of energy by way of the plurality of output connections. The control unit is configured to pass energy from the energy intermediate storage device to the plurality of output connections when the energy drawn at the output connections cannot be made available completely using the interface to the electrical energy supply grid.

4 Claims, 1 Drawing Sheet

(56) References Cited

U.S. PATENT DOCUMENTS

| | | | |
|---|---|---|---|
| 2012/0280655 A1* | 11/2012 | Schneider | B60L 53/53 320/109 |
| 2013/0057211 A1 | 3/2013 | Kuribayashi et al. | |
| 2014/0176051 A1 | 6/2014 | Hayashi et al. | |
| 2014/0347018 A1 | 11/2014 | Boblett et al. | |
| 2015/0015213 A1* | 1/2015 | Brooks | H02J 3/24 320/137 |
| 2015/0061569 A1 | 3/2015 | Alexander et al. | |
| 2015/0328999 A1 | 11/2015 | Dureau et al. | |

FOREIGN PATENT DOCUMENTS

| | | |
|---|---|---|
| EP | 2647522 A1 | 10/2013 |
| EP | 2875985 A1 | 5/2015 |
| EP | 2875986 A1 | 5/2015 |
| JP | H08140285 A | 5/1996 |
| JP | 2008141926 A | 6/2008 |
| JP | 2011091979 A | 5/2011 |
| JP | 2013031243 A | 3/2013 |
| JP | 2011118187 A1 | 7/2013 |
| JP | 2014063492 A | 4/2014 |
| JP | 2014099958 A | 5/2014 |
| JP | 2015039289 A | 2/2015 |
| WO | 2013/008429 A1 | 1/2013 |
| WO | 2013031073 A1 | 3/2013 |

* cited by examiner

ELECTRIC VEHICLE CHARGING STATION AND METHOD FOR CONTROLLING AN ELECTRIC VEHICLE CHARGING STATION

BACKGROUND

Technical Field

The present invention concerns an electric vehicle charging station and a method of controlling an electric vehicle charging station.

Description of the Related Art

Charging stations for electric vehicles have long been known and typically have a cable with a plug which is fitted into a socket in or on the electric vehicle in order to charge up an energy storage means in or on the electric vehicle.

Efficient and rapid charging of the energy storage devices in the electric vehicles is an essential factor for success of electric vehicles.

In the patent application from which priority is claimed, the German Patent and Trade Mark Office searched the following documents: EP 2 875 985 A1, EP 2 647 522 A1, EP 2 875 986 A1, US 2013/0057211 A1, DE 10 2009 046 422 A1 and DE 10 2010 062 362 A1.

BRIEF SUMMARY

Provided is a charging station for electric vehicles, which permits efficient and rapid charging of the electric vehicles.

An electric vehicle charging station and a method of controlling an electric vehicle charging station are provided.

Thus, there is provided an electric vehicle charging station comprising an interface, by way of which the charging station receives energy from an electrical energy supply grid, an energy intermediate storage device for intermediate storage of energy received or transmitted by way of the interface from the electrical energy supply grid, a plurality of output connections for charging electric vehicles and a control unit for controlling the energy intermediate storage in the energy intermediate storage device and for controlling the delivery of energy by way of the output connections. The control unit is adapted to pass energy from the energy intermediate storage device to the output connections when the energy required at the output connections cannot be made available completely by way of the interface by the electrical energy supply grid.

According to an aspect of the present invention the control unit is adapted in dependence on a fault in the energy supply grid to initiate energy intake from the energy supply grid by the intermediate storage device or energy delivery from the intermediate storage device into the energy supply grid.

The electric vehicle charging station has an energy intermediate storage device. That intermediate storage device can be charged up with energy from an energy supply grid. If, for example, no charging or only very little charging of electric vehicles takes place the intermediate storage device can be charged up. The charging station can be provided, for example, in the form of a container or smart container and can be coupled to an energy supply grid. In addition, the charging station/the container can have a plurality of cables with corresponding plugs so that a plurality of electric vehicles can be charged up at the same time. In particular, if many electric vehicles are to be charged up at the same time it can then happen that the required amount of energy cannot be delivered by way of the energy supply grid to which the container or the charging station is connected. In such cases it is possible to fall back to the energy intermediate storage device which is disposed in the container or coupled thereto. In that case the energy in the energy intermediate storage device can be used to at least partially charge up the electric vehicles connected to the charging station.

The invention is useful in particular when the amount of energy used by the electric vehicles connected to the charging station cannot be transmitted by way of the interface between the energy supply grid and the charging station. If, for example, an electric vehicle uses between 50 and 70 kW then ten electric vehicles already uses between 500 and 700 kW for fast charging.

The energy storage device disposed in the charging station or in the charging container can also be used for the intermediate storage of energy from the electrical energy supply grid so that the charging station or the charging container can become operative in grid-supporting relationship. That is advantageous, in particular, in a fault situation in the electrical energy supply grid.

According to an aspect of the present invention, the intermediate storage device in the charging station can be used for supporting the electrical supply grid. The intermediate storage device can, thus, be fixedly operated as a buffer in the event of a grid fault between the electric vehicle and the energy supply grid. In addition, the intermediate storage device or the energy stored therein can be used for grid protection, for example, in the event of an overfrequency or an underfrequency, that is to say, if a fault occurs in the energy supply grid and the grid frequency is above or below the nominal frequency. An overfrequency represents a grid frequency which is higher than a reference grid frequency. An underfrequency represents a grid frequency which is lower than the reference grid frequency.

BRIEF DESCRIPTION OF THE SEVERAL VIEWS OF THE DRAWINGS

Advantages and embodiments by way of example of the invention are described in greater detail hereinafter with reference to the drawing.

DETAILED DESCRIPTION

Figure 1:
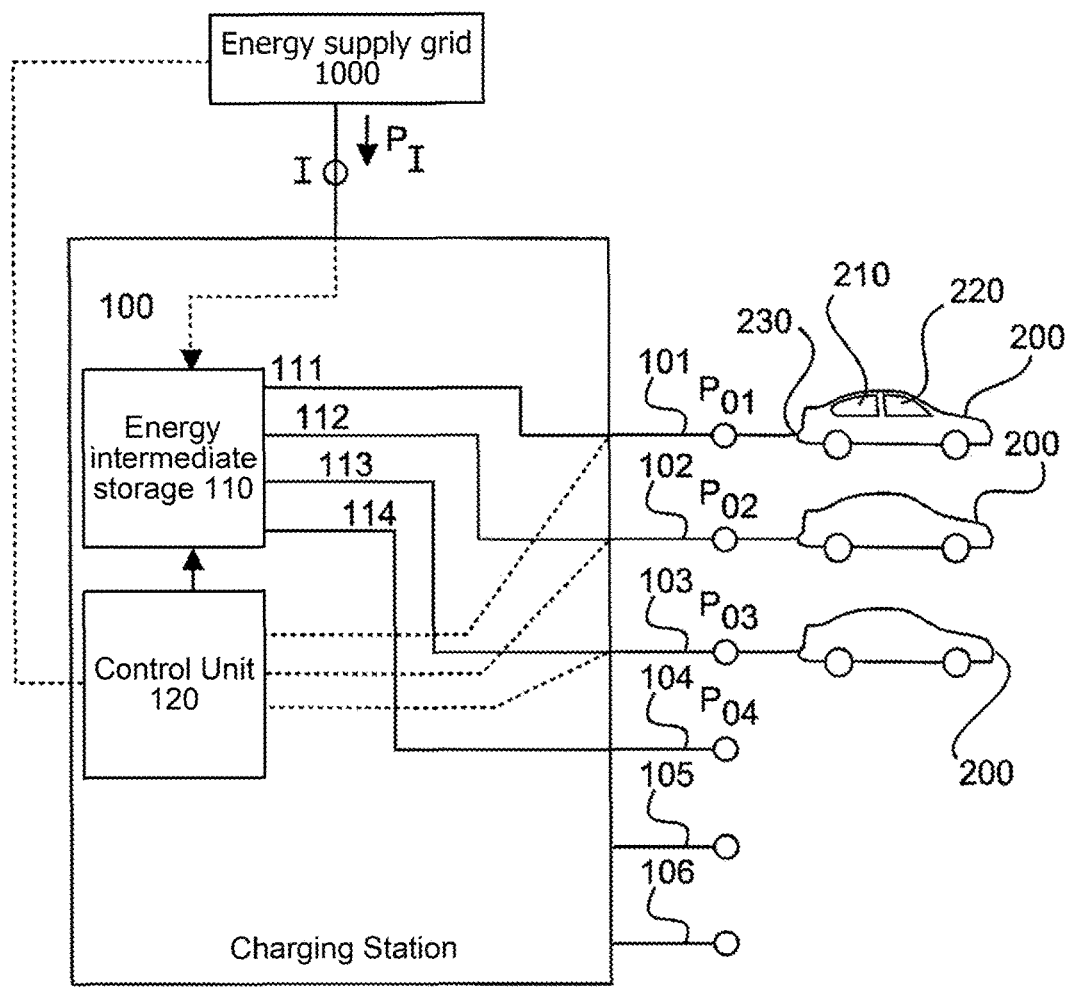
FIG. 1 shows a diagrammatic view of a charging station according to the invention.

FIG. 1 shows a diagrammatic view of an electric vehicle charging station. A charging station or a charging container 100 for electric vehicles 200 is connected to an electrical energy supply grid 1000 by way of an interface I. A power $P_I$ can be transmitted by way of the interface I from the electrical energy supply grid to the charging station. The charging station 100 has an energy intermediate storage device 110 and a control unit 120. The charging station 100 also has a plurality of charging connections 101-106. The number of charging connections can vary. An electrical power $P_{O1}$-$P_{O6}$ can be transmitted by way of each of the charging connections 101-106. A respective electric vehicle 200 can optionally be connected to the connections 101-106. The electric vehicles 200 have rechargeable energy storage devices 210 (for example, an accumulator), a control unit 220 and an interface 230. The electric vehicle 200 can be connected to one of the connections 101-106 by way of the interface 230 in order to transmit electrical energy from the charging station 100 into the storage means 210.

The charging station or the charging container 100 has an energy intermediate storage device 110. That intermediate storage device 110 can optionally be of such dimensions that the energy stored therein can be sufficient to charge up a plurality of electric vehicles 200. The electric vehicles 200 can thus be charged up by way of the energy stored in the energy intermediate storage device 110. As an alternative thereto the energy required for charging up the electric vehicles 200 can be made available directly from the electrical energy supply grid 1000 by means of the charging station 100.

If, however, the number of electric vehicles 200 which are to be charged up simultaneously at the charging station 100 is too high and the energy made available by the electrical energy supply grid 1000 is not sufficient for all electric vehicles 200 it is then possible to have access to the energy stored in the intermediate storage device 110 to charge up the electric vehicles.

Thus, effective fast charging even of a multiplicity of electric vehicles can be ensured at the same time at the charging station or the charging container.

The control unit 120 can also be connected to the electrical energy supply grid 1000 in order to obtain information from the electrical energy supply grid 1000. Particularly in a fault situation in the energy supply grid 1000 the control unit 120 can control charging of the energy intermediate storage device 110. If, for example, there is too much energy in the energy supply grid 1000 then energy from the electrical energy supply grid 1000 can be stored in the energy intermediate storage device 110. If, for example, there is not sufficient energy in the electrical energy supply grid 1000 then energy can be transmitted from the energy intermediate storage device 110 to the electrical energy supply grid.

Electric vehicles can be motor vehicles (like automobiles and trucks), motor cycles, bicycles, aircraft and so forth.

A fault in the energy supply grid 1000 can be an over/under-voltage or an over/under-frequency.

The charging station can be used with the energy intermediate storage device 110 for grid support.

Figure 2:
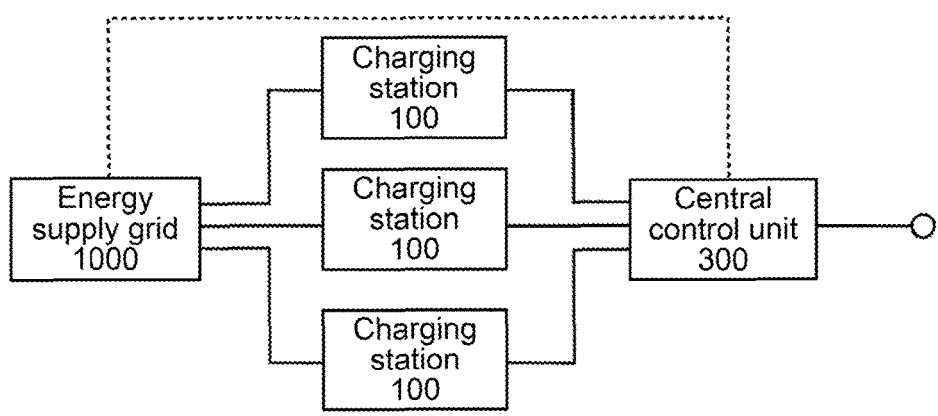
FIG. 2 shows a block circuit diagram of an environment involving a plurality of charging stations according to the invention.

FIG. 2 shows a block circuit diagram of an environment involving a plurality of charging stations. A plurality of charging stations 100 is coupled both to the energy supply grid 1000 and also to a central control unit 300. The central control unit 300 can monitor the grid voltage and/or grid frequency in the energy supply grid 1000. If a fault occurs in the energy supply grid, that is to say if the detected voltage differs from the reference grid voltage and/or if the grid frequency differs from the reference nominal grid frequency by a tolerance range then the central control unit 300 can intervene in operation of the charging stations 100. That can occur in particular to contribute to grid support.

If the grid frequency drops below a first limit value then the central control unit 300 can operate the charging stations 100 in such a way that energy is delivered from the supply grid into the intermediate storage devices of the charging stations. The charging stations, therefore, receive excessive energy from the supply grid, for example, to be able to stabilize the grid frequency. If the grid frequency exceeds a second limit value then energy can be taken from the intermediate storage devices of the charging stations and delivered to the electrical energy supply grid.

The electric charging stations can have a charging mode and a discharging mode. During the charging mode, for example, energy can be taken from the energy supply grid and output to the connected electric vehicles. In a discharging mode energy can be delivered from the intermediate storage device to the electrical energy supply grid.

According to an aspect of the present invention there can be provided a minimum charging of the intermediate storage device, below which it is not to fall in the discharging mode in order to ensure that the intermediate storage device can deliver energy to the connected charging stations if it is not possible to provide sufficient energy by way of the connection to the electric grid for charging the connected electric vehicles.

The intermediate storage device can be connected on a low-voltage level (between 1 and 20 kV).

The charging stations can thus actively intervene to support for the grid. If there are a plurality of charging stations which are geographically distributed then the accumulated storage capability of the intermediate storage devices can be sufficient to positively support the grid.

The invention claimed is:

1. An electric vehicle charging station, comprising:
   an interface, between the charging station and an electrical energy supply grid, for the charging station to receive energy from and transmit energy to the electrical energy supply grid,
   an energy intermediate storage device for intermediate storage of the energy transmitted to or received from the electrical energy supply grid using the interface,
   a plurality of output connections for charging electric a plurality of vehicles simultaneously, and
   a control unit for controlling intermediate energy storage in the energy intermediate storage device and for controlling delivery of energy using the plurality of output connections in a first operational mode charging the plurality of electrical vehicles coupled to the plurality of output connections with energy from the electrical supply grid via the interface,
   wherein the control unit is configured to, in a second operating mode, cause energy to be provided from the energy intermediate storage device to the plurality of electrical vehicles coupled to the output connections if the energy drawn at the plurality of output connections cannot be provided completely by the electrical energy supply grid via the interface,
   wherein the control unit is configured to, in a third operating mode and based on a first fault in the electrical energy supply grid, initiate energy intake from the electrical energy supply grid by the intermediate storage device, to remove excess energy from the electrical supply grid to support the electrical supply grid during the first fault, and
   wherein the control unit is configured to, in a fourth operating mode and based on a second fault in the electrical energy supply grid, initiate an energy delivery from the intermediate storage device into the electrical energy supply grid to provide additional energy to the electrical supply grid to support the electrical supply grid during the second fault.

2. The electric vehicle charging station according to claim 1, wherein the first fault in the energy supply grid is an overfrequency of a grid frequency of the electrical energy supply grid, and wherein the control unit is configured to cause energy to be taken from the electrical energy supply grid and stored in the intermediate storage device during the first fault.

3. A method of controlling a plurality of electric vehicle charging stations, comprising:
   receiving energy from or transmitting energy to an electrical energy supply grid using an interface between the electrical energy supply grid and the plurality of electric vehicle charging stations, storing, in an energy intermediate storage device, energy transmitted to or received from the electrical energy supply grid over the interface, charging a plurality of electric vehicles at a plurality of output connections, respectively, controlling, by a control unit, energy storage in the energy intermediate storage device, in a first operating mode controlling, by a control unit, delivery of energy to the plurality of electrical vehicles using the plurality of output connections with energy received via the interface, in a second operating mode passing energy from the energy intermediate storage device to the plurality of output connections if the energy received at the output connections is not sufficient to charge the plurality of electric vehicles, in a third operating mode initiating energy intake, from the electrical energy supply grid by the intermediate storage device, based on a first fault in the electrical energy supply grid to support the electrical supply grid during the first fault, and in a fourth operating mode initiating energy delivery, from the intermediate storage device into the electrical energy supply grid, based on a second fault in the electrical energy supply grid to support the electrical supply grid during the second fault.

4. The method of controlling the at least one electric vehicle charging station according to claim 3, wherein:

the first fault is an overfrequency of a grid frequency in the electrical energy supply grid, and the method of controlling the at least one electric vehicle charging station further comprises:

taking energy from the electrical energy supply grid and storing the energy in the intermediate storage device, and initiating, by a central control unit, drawing energy from the electrical energy supply grid by a plurality of electric vehicle charging stations based on detection of the first fault in the electrical energy supply grid.

* * * * *